United States Patent [19]
Savill

[11] Patent Number: 5,542,630
[45] Date of Patent: Aug. 6, 1996

[54] CONTROL OF FLUID FLOW

[75] Inventor: Anthony M. Savill, Cambridge, England

[73] Assignee: Rolls-Royce plc, London, England

[21] Appl. No.: 302,882

[22] PCT Filed: Feb. 26, 1993

[86] PCT No.: PCT/GB93/00405

§ 371 Date: Sep. 19, 1994

§ 102(e) Date: Sep. 19, 1994

[87] PCT Pub. No.: WO93/19980

PCT Pub. Date: Oct. 14, 1993

[30] Foreign Application Priority Data

Mar. 31, 1992 [GB] United Kingdom .................. 9206999

[51] Int. Cl.$^6$ .......................... B64C 21/00; B64C 21/06
[52] U.S. Cl. ........................................ 244/200; 244/209
[58] Field of Search ................... 244/200, 199, 244/198, 130, 207–209; 138/37, 38

[56] References Cited

U.S. PATENT DOCUMENTS

| | | | |
|---|---|---|---|
| 1,355,624 | 10/1920 | Sharkey | 244/200 |
| 2,223,744 | 12/1940 | Stalker | 244/208 |
| 4,522,360 | 6/1985 | Barwell et al. | 244/208 |
| 4,863,121 | 9/1989 | Savill . | |
| 4,865,271 | 9/1989 | Savill . | |
| 4,930,729 | 6/1990 | Savill . | |
| 4,932,612 | 6/1990 | Blackwelder et al. | 244/208 |
| 5,026,232 | 6/1991 | Savill . | |
| 5,133,516 | 7/1992 | Marentic et al. | 244/130 |
| 5,167,387 | 12/1992 | Hartwich | 244/200 |

FOREIGN PATENT DOCUMENTS

| | | |
|---|---|---|
| 0126199 | 11/1984 | European Pat. Off. . |
| 0246916 | 11/1987 | European Pat. Off. . |
| 845900 | 8/1958 | Germany . |
| 2167157 | 5/1986 | United Kingdom . |
| 2187261 | 9/1987 | United Kingdom . |

OTHER PUBLICATIONS

Drag Charcteristics of V–Groove and Transverse Curvature Riblets pp. 168–184.

AIAA–83–0377–New Results, a Review and Synthesis of the Mechanism of Turbulence Production in Boundary Layers and its Modification, R. E. Falco, Michigan State Univ., East Lansing MS, pp. 1–16, Jan. 10–13, 1993 Reno, Nevada.

AIAA–85–0547 The Effects of Cylinder Surface Modifications on Turbulent Boundary Layers, J. B. Johansen and C. R. Smith, Lehigh Univ., Bethlehem, PA, pp. 1–10, Mar. 12–14, 1985 (Boulder Colorado).

The Effects of Longitudinal Roughness Elements and Local Suction upon the Turbulent Boundary Layer, J. B. Roon and R. F. Blackwelder, Department of Aerospace Engineering, University of Southern California, Los Angeles, California, 517–524.

*Primary Examiner*—Galen L. Barefoot
*Attorney, Agent, or Firm*—Cushman Darby & Cushman, L.L.P.

[57]  ABSTRACT

Measures are disclosed for modifying the boundary layer flow over fluid dynamic surfaces using patterns of riblets which are set at a peak-to-peak spacing substantially less than 80 wall units and which are provided with boundary layer suction means comprising apertures (A) between the riblets for a combinative improvement of boundary layer flow. In a further aspect, riblets are employed in combination with wall apertures as an improved means of shock wave (W) control by permitting recirculation of boundary layer fluid from downstream to upstream of the shock wave.

19 Claims, 1 Drawing Sheet

CONTROL OF FLUID FLOW

FIELD OF THE INVENTION

This invention relates to the modification of CONTROL OF FLUID FLOW boundary layer flows over fluid dynamic surfaces, which may be aerodynamic or hydrodynamic surfaces. It is particularly concerned with the use of small-geometry surface configurations comprising rib-like elements to modify heat, mass or momentum transport by controlling interaction of a boundary layer of the flow with the surface.

BACKGROUND OF THE INVENTION

There have been many investigations in recent years of the effects that small-geometry surface configurations can have on turbulent boundary layers. Particular attention has been paid to the provision of so-called riblet surfaces in which an array of small longitudinal rib-like elements known as riblets extend over the turbulent boundary layer region of a surface in the direction of fluid flow over the surface, to reduce momentum transport or drag. Experimental results indicate that net surface drag reductions of up to about 7% can be achieved.

In a paper "Drag Characteristics of V-Groove and Transverse Curvature Riblets" (presented by M. J. Walsh at the Symposium on Viscous Drag Reduction, Dallas, Tex., Nov. 7–8, 1979) reference is made to an early investigation (1966) by Liu, Kline, and Johnston in which drag reductions of 3–4% were obtained by reducing the turbulent bursting rate, i.e. the rate of break-up of the low speed longitudinal vortices that characteristically form in a turbulent boundary layer flow close to a wall, by employing rectangular fins. Walsh's paper reports the investigation of a number of alternative rib profiles and states he was able to obtain a maximum drag reduction of 7% using V-groove riblets.

In the prior art and later in this specification it is often usual to refer to "streaks" rather than longitudinal vortices, although strictly speaking a streak is merely the visible manifestation of vortices in smoke tunnel experiments, and the present specification will follow this practice.

The drag reduction observed in the experiment referred to above may be associated with the ability of riblets to limit random spanwise movements of the streaks, as has been suggested by a number of sources, e.g. R. E. Falco (AIAA-83-0377, AIAA 21st Aerospace Sciences Meeting, Jan. 10–13 1983, Reno, Nev.). Johansen and Smith (AIAA-85-0547, AIAA-Shear Flow Control Conference, Mar. 12–14, 1985, Boulder, Colo.) have shown that cylindrical riblets of a smaller height than the V-groove riblets with which Walsh obtained his optimum results, may have the effect of anchoring and/or creating sites of low-speed streaks in a limited region above the wall surface, but their experiments also showed drag increases of 3% to 8%.

The results reported from these and other previous investigations all showed that although the effect of riblets may be beneficial it is rather small for practical purposes and that has led to the search for alternative geometries and combinations of techniques offering larger benefits.

In particular, R. F. Blackwelder and J. B. Roon, in "The Effects of Longitudinal Roughness Elements and Local Suction upon the Turbulent Boundary Layer" in "Structure of Turbulence & Drag Reduction" (Ed: A Gyr, Springer 1990) 517)) have attempted to use more widely spaced riblets than those in the earlier experiments referred to, as 'streak anchors' in combination with suction through the wall surface in order to improve efficiency. The object was to reduce the number of longitudinal vortices or streaks by placing round wires in the streamwise direction of a wall surface, at such a spanwise spacing that a pair of oppositely rotating streaks could establish themselves over the flat wall surface mainly left clear by the wires. Suction was applied through the surface midway between the wires to the upwardly flowing regions of the streaks in this mid region to weaken the streaks and it was found that the number of streaks were reduced.

The spanwise spacing referred to in the preceding paragraph was 80 wall units, a "wall unit" being the conventional unit in the art for expressing the length values and distributions of the projections. It is a dimensionless unit comprising an actual length value multiplied by a scalar quantity expressing the variation of wall shear stress with fluid density and viscosity.

The 80 wall unit spacing corresponds substantially to the natural spanwise width of each pair of counter-rotating vortices. The wires therefore simply served the function of anchoring the streaks spanwise, being set at the natural spacing of the streaks, and so ensured that the suction apertures were applied to the appropriate regions of the streaks. They had no drag reduction capability themselves. Some advantages have been indicated—a drag reduction of up to 2½%—but any measure of the net benefit must take account of pumping power required to operate such a system.

SUMMARY OF THE INVENTION

It is an object of the present invention to provide methods and means whereby the flow over wall surfaces can be beneficially modified, whether in respect of momentum transport (to reduce surface drag) or heat transport (to improve heat transfer characteristics between the fluid flow and the wall) or mass transport (to achieve more favourable dispersal or retention of substances held on the wall surface), by the combined use of small geometry surface configurations with wall suction means.

According to the present invention, suction is applied to a wall surface between successive projections of a plurality of closely spaced projections (spacing between zero and an amount less than the combined base widths of the two projections) on the wall surface and extending substantially in the direction of fluid flow relative to the surface for modification of the fluid flow over said surface to enhance the flow modifying effects of the projections.

The use of suction in this manner offers particular advantages in laminar flow conditions. It is known to provide a suction panel on the laminar flow region of an aircraft wing, but the use of suction at the bases of a series of projections or riblets in a laminar flow region brings the drag-reducing advantages of the projections and reduces power demand because suction is required only at the bases of the projections instead of substantially the whole area being treated, so that a greater drag reduction can be produced more economically.

Furthermore, the use of suction in a turbulent flow region of a wall surface with appropriate patterns of projections brings the possibility of an enhanced combinative effect so that skin friction is reduced by the additive results of (i) keeping the vortices away from the wall surface, (ii) moving the vortices apart and (iii) removing vortices.

In one preferred arrangement according to the invention, a series of projections are provided the height of which varies along the direction of fluid flow. This variation may be accommodated by increasing the aspect ratio of the transverse cross-sectional profile of the projections with distance along the direction of flow while in some instances it may be possible to allow the projections to spread fanwise as they increase in height. For use with the present invention, however, there can be advantages in providing increasing height projections whose transverse cross-sections taper from base to peak, with an aspect ratio that is maintained essentially constant with change of height. At least in its upstream region such a pattern will have large spaces between the projections, which may be simply flat-bottomed valleys, these spaces progressively narrowing as the projections grow in the direction of the fluid flow, but at least in their upstream regions having spaces between them. The suction apertures can be very conveniently placed in said spaces, which can be flat-bottomed and so facilitate the formation of the apertures.

Where projections are provided with a varying height along their length, it is preferable to have a continuous increase (or decrease) of height, the projections then appearing as "ramplets". A simpler arrangement, although possibly less efficient, would be to provide succeeding bands of higher projections, but the projections of each band having a uniform height. The bands are assembled together to present to the stream a series of projections with progressively stepped increasing heights. The successive bands of projections may also be given different projection-to-projection pitches.

The varying height projections can be configured to give optimum changes of height per unit length. In a preferred arrangement the projections have heights which, when expressed in wall units, change with distance along the wall surface in the direction of fluid flow at a rate per meter given by the expression $S\% + V\% + R\% + F\%$ per meter length, with the ranges $5 < S\% < 10$; $10 < R\% < 20$; $0 < V\% < 300$; $-80 < F\% < 500$,

- where $S\%$ is a percentage rate of change in height for acting against the reduction in wall shear stress, and hence the self-limiting effect of the projections, caused by progressive displacement of boundary layer turbulence away from the wall surface by the projections,
- $R\%$ is a percentage rate of change in height for acting against the effect of skin friction variation, and hence the variation of effective height of a uniform height projection, and other Reynolds Number dependent effects, independent of wall surface curvature and pressure gradient in the fluid flow thereover;
- $V\%$ is a percentage rate of change in height to take advantage of an inherent ability of increasing height projections to move boundary layer turbulence further from the wall surface than constant height projections of the same initial upstream height;
- $F\%$ is a percentage rate of change in height for acting against the effect of skin friction variation caused by the presence of such other effects as those from LEBU's introduced upstream of the projections, streamwise pressure gradients, or streamwise curvature of the wall surface, and natural variations of skin friction through the transition region.

As to the factor F, it should be noted that if $C_f$ (coefficient of skin friction) increases sharply, as in the early stage of transition there may be negative variations. That is to say the height of the projections may then decrease in height along the direction of the fluid flow.

In turbulent flow conditions the projections function to inhibit turbulent motions in the boundary layer from penetrating to all parts of the wall surface, in particular deep into the grooves, resulting in a displacement of the turbulent motion away from the wall. With regard to the factor S, the progressive increase of the height of the projections can extend those effects without disrupting the flow pattern. A secondary benefit arises because the self-limiting tendency of the flow, due to the fact that a virtual wall position is created at a substantial part of the initial height of the projections, is opposed by the increase of the projection height. The increase of projection height can therefore counter the degradation of their performance that would otherwise result from that tendency.

This benefit can be enhanced with varying height projections because the progressive reduction of wall shear stress with streamwise development length already referred to can be countered by increase of height of the projections in the factor V. This can result in the height increasing more than compensates for the degradation of performance that the change of virtual wall position would produce on fixed height projections.

More specifically, in a region of turbulent flow, for a wall surface which is essentially flat in the streamwise direction and is provided with varying height projections optimised for a streamwise pressure gradient in fluid flow thereover which is essentially zero, the projections preferably have a rate of increase in non-dimensionalised (wall unit) height in the range of 15% to about 300% per meter length.

Whether or not the change of projection height is made in a continuous manner, at the onset of transition flow and at the end of transition flow relatively sharply changing height projections may be required to optimise for the sharp decrease in skin friction which occur at the onset of transition (giving decreasing height projections) and increase in skin friction at the last stage of transition (giving increasing height projections).

With regard to the rate of change of height F%, for a wall surface which is essentially flat in the streamwise direction and which is operating in a turbulent boundary layer region with at least one tandem LEBU (large eddy break up) device the projections increase in wall unit height by up to about 125% per meter length for a distance equivalent to about 30 to 40 boundary layer thicknesses downstream of the LEBU device.

To compensate for streamwise pressure gradients, the height variation F% will give an increase or decrease of height depending on whether the streamwise pressure gradient is positive or negative. For optimum results, the factor F% will alter the non-dimensionalised wall unit height of the projections by an amount per unit length which is sufficient to counteract the change in skin friction of the fluid flow caused by the pressure gradient.

The present invention can also take advantage of the benefits obtainable from spanwise variations in the heights of the projections relative to each other. U.S. Pat. No. 4,930,729 discloses a number of possible ways in which this can be done and further description is not necessary here.

If the projections are provided in a region of laminar flow, they are preferably given a height of between 0.03 and 0.2 of the boundary layer displacement thickness height, more preferably not substantially less than 0.1 of said boundary layer thickness. That is to say, the height of the projections increases in the direction of the fluid flow by an amount scaled to the local boundary layer thickness.

A wall surface according to the invention can be arranged to operate in a transitional regime in addition to laminar and turbulent regimes. The projections may thus extend continuously along a surface over which all three types of flow occur in sequence.

The projections in the transition region may also be scaled to the boundary layer displacement thickness or their heights may be adjusted along their length to blend with the downstream heights of the projections in the upstream laminar region and with the upstream heights of the projections in the downstream turbulent region. Where the different scalings would give abrupt changes of height of the projections, it may be preferred to make the projections discontinuous so that there is a short gap between the differently scaled portions.

Control of the fluid flow in the transition region by means of the projections and the suction in each case can help to retard the tendency of the flow in this region to transform from an essentially two dimensional flow to a three dimensional flow. It can therefore delay the onset of fully turbulent flow and thereby reduce the resultant drag.

Particularly when there is turbulent flow, in a preferred configuration according to the present invention, the projections, or at least the larger height projections where there are projections of different heights side by side, have side faces that are inclined at an angle that varies over the height of the projections. Such possibilities are also disclosed in U.S. Pat. No. 4,930,729 referred to above.

Finally, another novel combinative effect may be obtained by the use of arrays of projections of the kind already referred to in conjunction with the known method of passive shock control in which passages within a wall on the surface of which a shock wave is established allow fluid to circulate from the higher pressure region downstream of the shock wave to the lower pressure region ahead of the shock wave. It is known that if projections are not too large, e.g. not substantially more than 25 wall units high, they do not worsen the characteristics of a shock wave. By providing the recirculation apertures at the roots of the projections more effective use can be made of the recirculating fluid.

In the various forms taken by the various embodiments of this invention, the projections preferably form a substantially continuous spanwise array. It is also preferred that both the larger and smaller projections, where different heights exist side by side, are formed with sharp-peaked profiles.

BRIEF DESCRIPTION OF THE DRAWINGS

By way of example, embodiments of the invention will now be described in more detail with reference to the accompanying schematic drawings. In the drawings:

FIG. 4 illustrates in an axial section the application of the invention for shock control.

DETAILED DESCRIPTION OF THE INVENTION

Figure 1:
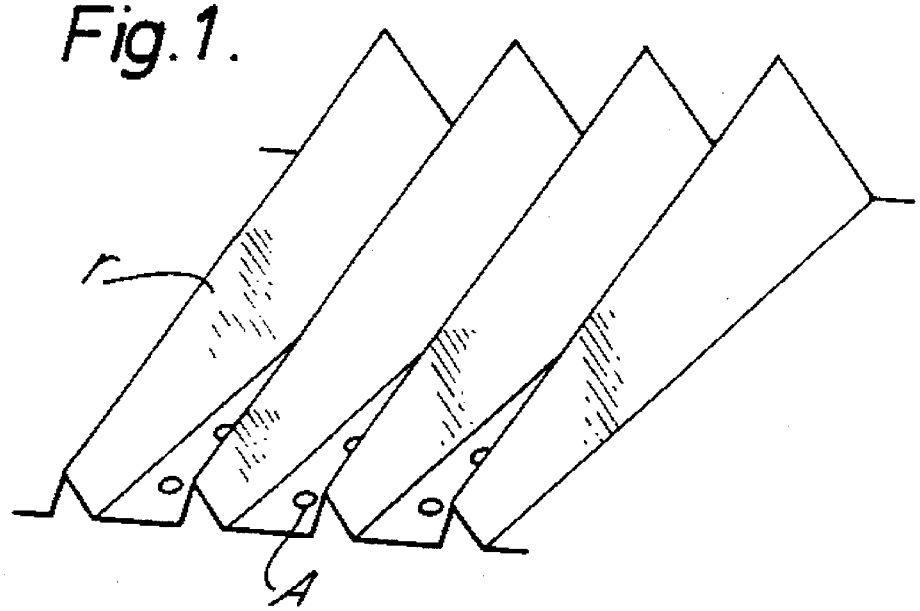
FIG. 1 is an oblique view of part of one form of wall surface according to the invention.

In FIG. 1 the wall surface has a continuous series of riblets r running in the streamwise direction over the surface. These riblets may alternatively be termed ramplets because their height increases continuously along their length. Although shown with triangular profiles, they can have other profiles, some examples of which are described in U.S. Pat. No. 4,930,729.

The cross-section of the ramplets has a constant aspect ratio, with flat-bottomed valleys between adjacent ramplets at the downstream end, progressively narrowing as the base widths of the projections increase with their height. The wall is provided with a series of apertures A along the length of each valley for connection to a suction source (not shown). The apertures have a diameter preferably not substantially greater than 60 microns but possibly as little as 20 microns. In use, the suction can be operated in an analogous way to known boundary layer suction methods and in so doing it enhances the friction reducing characteristics of the riblets that have already been described. In comparison with known suction control surfaces, less power is needed for suction because the apertures are confined to the valleys and will mainly draw in fluid that is effectively deeper in the boundary layer.

Figure 2:
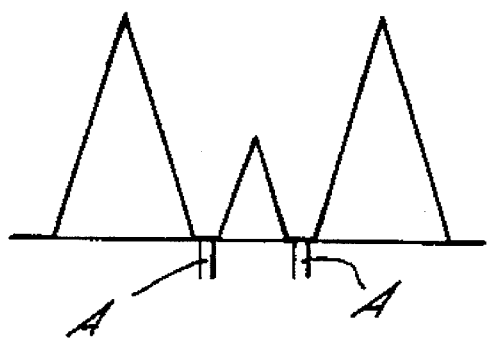
FIGS. 2 to 4 are fragmentary cross-sections of modified forms of wall surface of FIG. 1.
Figure 3:
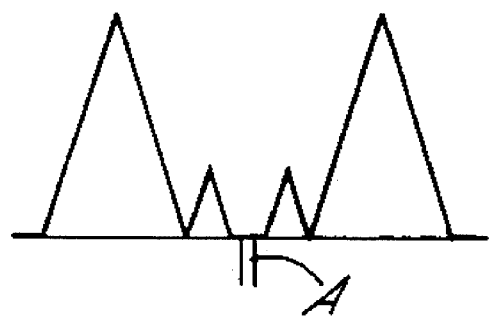

Suction can be used to good effect with the compound height ramplets which have a spanwise pattern of different heights, such as are described in U.S. Pat. No. 4,930,729. The patterns are preferably so adapted, however, so that flat valley portions occur between adjacent ramplets for each of manufacturing the suction apertures. FIG. 2 is an example in which in a plane perpendicular to the flow direction successive ramplets across the span have different heights and suction apertures open into the flat valley portions. FIG. 3, is a similar view showing successive higher ramplets separated by a plurality of lower ramplets. As is clear from FIG. 3 also, it may not be necessary to apply suction to every valley in the riblet array.

The invention does not preclude the possibility of forming the ramplets with non-planar valley bottoms, in particular as more or less sharp-angled V-grooves if it is practical to make apertures of size required in a non-planar face. Nor is it necessary to maintain a constant aspect ratio: the width may be kept constant as the height increases.

The preferred sizes and dimensional relationships of the riblets are expressed in the non-dimensional form of so-called "law of the wall", in which actual distance values are multiplied by a "wall unit" scalar quantity defined as:

$$\frac{\sqrt{\frac{\tau}{\rho}}}{\nu}$$

where $\tau$ is the wall shear stress, $\rho$ is the fluid density, and $\nu$ is the fluid kinematic viscosity.

In the example of FIG. 1 the ramplets have at their leading ends a non-dimensionalised height $h^{.}$ in the range: $2 \leq h^{.} \leq 20$, preferably between 5 and 15 wall units, their base widths $w^{.}$ being the same so that their aspect ratio $h^{.}/w^{.}$ at their leading ends is 1. The spanwise pitch or distance $s^{.}$ between adjacent apices is in the range: $6 \leq s^{.} \leq 40$, preferably between 10 and 30 wall units. Variations within the ranges specified may be made independently for either parameter.

In all cases, it may improve performance if, at their leading edges, the riblets are faired into the wall surface or are recessed to avoid drag increments associated with the flow meeting a bluff leading face. For reducing wetted area it may also be possible to have short spanwise-extending gaps between successive areas of riblets, preferably extending less than the boundary layer thickness $\delta$ in the streamwise direction, themselves greater than $2\delta$ in streamwise length although that may result in increased pressure drag.

Furthermore, it is not essential that the riblets be aligned precisely with the fluid stream and a variety of experimental studies have shown in turbulent flow of at least, deviations of up to 10°–15° can be tolerated. Because of the improved control of vortex development another advantage of riblets may be an increased tolerance to yaw i.e. the maintenance of drag reduction to angles exceeding ±15°.

It is not always necessary to increase the height of the riblets along their length and any increase of height need not be produced in a continuous manner. For ease of manufacture a progressive increase of height may be obtained in a series of steps, each uniform height length being produced relatively easily by machining or extrusion, and if required at each step the leading edges can be faired. The pitch of the riblets can similarly be progressively increased at each stage, not necessarily simultaneously with an increase of height.

The extent to which beneficial effects may be obtained will depend in practice on the wall surfaces to which the riblets are applied and the limits at which flow separation occurs over these surfaces. In particular instances it may be possible to continue the increase of height of the riblets up to a factor of 5 or more, but even in less favourable conditions an increase by a factor of at least 2 should be possible.

Over a turbulent boundary layer region, in terms of non-dimensional "law of the wall" units the optimum rate of increase of riblet height will be at least 15%, comprising a 5% to 10% rate per meter to compensate for the self-limiting effect and about a 10 to 20% rate per meter to compensate for the effect of skin friction variation and other Reynolds number effects. Allowing for the fact that skin friction is a function of velocity, the total optimum rate as a continuous increase of height might in practice be up to 50% per meter or even higher, up to about 300% per meter, the latter figure being attainable because of the ability of the progressively increasing height riblets to force the turbulent boundary layer flow further away from the basic wall surface. These figures assume a planar basic surface upon which the riblets are provided, with fluid flow thereover having a zero pressure gradient.

As has already been mentioned, however, there are factors which require a decrease of riblet height for compensation, especially if the flow is transitional. The different factors must be combined to give an optimum resultant change of height which may be positive or negative.

A number of specific situations can be identified in which increasing or decreasing height riblets are needed in order to improve drag-reduction performance, in all of which the use of suction as described gives a further enhancement. A number of such situations are outlined below to illustrate the considerations involved.

A first situation is immediately downstream of a LEBU. An advantageous application of the increasing height riblets is in conjunction with LEBU's where they can prolong the effective stream length in which the drag reduction effects of the LEBU's are experienced, in comparison with the known use of LEBU's with constant height riblet surfaces as proposed in U.S. Pat. No. 4,706,910 of Walsh et al. As an example of the combination of increasing height riblets with LEBU's, consider a tandem LEBU device optimised for maximum drag reduction, comprising two LEBU's placed in flow series with respect to each other, with a distance of about 10 boundary layer thicknesses (10δ) between the two.

A reasonable estimate is that the skin friction coefficient $C_f(=\tau/\frac{1}{2}\rho U^2$, where is the fluid density and U is the velocity at the edge of the boundary layer) may reduce by up to 50% until it reaches its greatest reduction at a distance of 30 to 40 δ downstream of the tandem device, measured from a point, say, midway, between the two LEBU's. Since the non-dimensionalised height of the riblets as determined by the "law of the wall" relationship depends upon the square root of the shear stress, and therefore of the local skin friction and friction velocity, it can easily be calculated that to maximise both the local and greatest reductions in skin friction, riblets provided in the above distance of 30–40 δ downstream of the LEBU's should increase in non-dimensional height by approximately 125% over this length downstream of the LEBU's. Beyond the location of the maximum skin friction reduction it is found that skin friction is very nearly constant for about a further 80–100 δ, so over this further distance the riblets should continue to run at the height they have reached at the downstream ends of the increasing height riblets.

As a second situation, adverse pressure gradient conditions provide scope for varying the riblet height. Under a severe pressure gradient e.g. such that separation is likely to occur within one meter in the flow direction it is believed that the skin friction coefficient may drop by up to 0.004 per meter, thus detracting from the performance available from constant height riblets. To counter this in full would require an increase in non-dimensional riblet height of 600% per meter length. In fact, it will not be desirable to utilise large rates of increase in riblet height if it encourages boundary layer separation, or if the disadvantage of increased drag on the riblets at off-design flow regimes outweighs the advantage of reduced drag at the flow regime for which the riblets are designed.

The flow over a convexly curved surface provides a third situation in which there is a need for varying height riblets. A measure of the severity of curvature in the direction of fluid flow with respect to the effect on the boundary layer is given by the ratio δ/radius of curvature, a typical value being about 0.05 for, say, the upper surface of an aircraft wing or an aeroengine nacelle. On such a surface, skin friction may drop by about 0.0015 per meter, which suggests that riblets on such surfaces should increase in non-dimensionalised height by about 130% per meter.

Decreasing height riblets may be appropriate to maximise drag-reduction performance where other factors prevail. As illustrations, two such situations are:

(a) In favourable pressure gradient conditions. Conversely to what has been said above for an adverse pressure gradient, it can be assumed that the wall shear stress and the skin friction coefficient increase, apparently necessitating decreasing height riblets due to the accompanying increase in friction velocity;

(b) On a concavely curved surface. On this type of surface, such as the "pressure surface" of an aerofoil, conversely to the convex surface situation described above, skin friction increases, again apparently necessitating decreasing height riblets.

It might be thought that in situations (a) and (b) above, the rate at which the riblet heights should decrease would be as much as 85% or (say) 25% per meter length respectively by analogy with the respective increases quoted for the converse of these situations. However, this is not the case for two reasons. Firstly, the boundary layer turbulence does not respond to favourable and unfavourable pressure gradients or to concavely and convexly curved surfaces in equal proportions, the response for favourable pressure gradients and concavely curved surfaces being about half that for the converse situations. This means that the decrease of riblet height, considering situations (a) and (b) in isolation from other factors, would only be up to 65% or (say) 30% per meter length respectively. Secondly, one of the major objects of the streamwise increase of the heights of the riblets is to increase the inhibiting effect of the riblets on penetration of boundary layer turbulence into the grooves and to increase the height of the virtual surface with respect to the riblets.

Excluding decreasing skin friction effects, the optimum rate of increase in riblet height to take advantage of the ability of the riblets to force the boundary layer turbulence further away from the basic wall surface is in the range of about 15 to 300% per meter, assuming zero pressure gradient flow over a plane basic wall surface. The actual optimum rate of change in height for riblets in situation (a) would be in the range of about a decrease of about 65% to 15% and for riblets in situation (b) would be in the range of a decrease of about 33% to an increase of 215%.

In a laminar flow boundary layer, a rate of increase of between 20% and 100% may be appropriate to increase the height of the riblets in direct proportion to the local boundary layer thickness. The riblet height will preferably be between 0.03 and 0.2 of the boundary layer thickness and generally at least 0.1 of the boundary layer thickness. At the transition region a decrease of height is called for, in the absence of other influences, and if ramplets are continued into the turbulent region their initial height will therefore be less than at the end of the laminar flow region. In adapting the riblet heights to the different flow regimes it may be necessary to allow for the fact that the suction will extend the laminar flow region.

Figure 4:
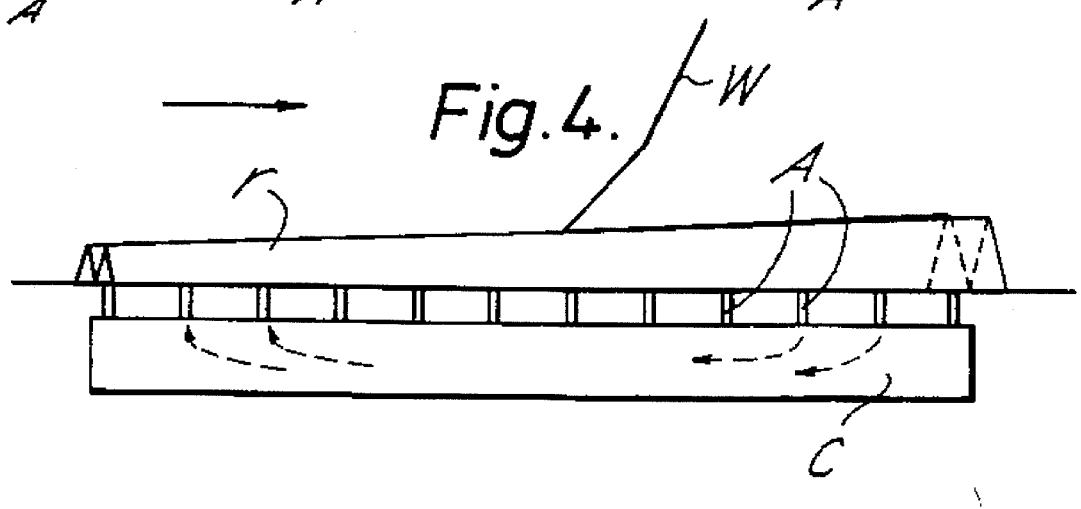

A further example of the invention is illustrated in FIG. 4 which shows a fragmentary portion of a wall surface in a fluid flow in which there is a shock wave W produced by a supersonic flow of, perhaps, Mach No. 1.3 to 1.5. Apertures A are formed through the wall and emerge at the wall surface between successive riblets r of a riblet array. All the apertures A communicate with a closed chamber C in the wall. The riblets are shown as ramplets, but they may have a uniform height, particularly if the length of the array is limited. The shock wave W produces a pressure change, with higher pressure downstream of the shock and the chamber C forms a plenum through which fluid is transferred in a direction counter to the fluid flow from the higher pressure region downstream of the shock to the lower pressure upstream of the shock.

The recirculation of fluid in this manner is known for the reduction of shock effects, in particular the pressure drag, but in the present case the riblets increase the effectiveness of the arrangement by drawing air in and returning it via the spaces between their sides. If the riblets themselves have a height not substantially greater than 25 wall units they will not have any adverse effect on the flow in the shock wave region.

In the supersonic region upstream of the shock wave skin friction is higher than in the higher pressure subsonic region downstream of the shock wave. If the riblets are to be given varying heights along their length, it is therefore desirable to have higher riblets in the subsonic region than in the supersonic region. Because in most applications the position of the shock wave will vary, the riblets adapt more easily to such variations if they are in the form of ramplets. Over the length of riblets, if the wall flow is turbulent the wall unit height of the ramplets at the downstream end of the recirculation region is at least 50% greater than the height at the downstream end. If conditions should be laminar or turbulent it is more appropriate to scale the increase of height to the local boundary layer thickness the preferred height being not substantially less than 0.1 the boundary layer thickness.

The invention is generally applicable to the wall surfaces of bodies in which a reduction of skin friction is sought. It may thus provide a means of reducing drag on the external surfaces of vehicles, including aircraft, land vehicles and watercraft. It can also be used in machines, e.g. for the blading, both rotating and stationary, of turbo-machines, and for the internal surfaces of pipes and conduits. It will be understood that the invention includes the possibility of forming the surface projections integrally with the bodies concerned and also of providing surface elements, e.g. as sheets or tapes, having the projections, for application to bodies to provide the required surface configurations thereon.

The description of the drawings has referred mainly to the drag reduction effects that can be obtained using the invention, by means of momentum transport. This is only one of the potential benefits offered by the invention. Because of the influence on flows close to a wall surface it is similarly possible to modify heat transfer rates between a wall surface and a flow over that surface. The patterns of riblets can also be used to modify the transfer of materials, as when it is required to release a coating material into a fluid flow at a controlled rate; it will be clear from the preceding description that if the material to be released is held deep between adjacent proportions it will pass into the fluid more slowly because the projections have moved the local high velocity areas such as the streaks further out.

I claim:

1. A fluid dynamic wall surface having a series of elongate projections on said surface, said projections being arranged side-by-side and extending lengthwise substantially in the direction of fluid flow relative to said surface for modification of a boundary layer of said fluid flow on said surface, said projections being located on said surface with a wall spacing between adjacent projections of from zero to two times the base widths of the projections on said surface, said suction means being located in said wall Spacing between at least some pairs of projections.

2. A wall surface according to claim 1 wherein said wall spacing is a flat valley wall occupying the spacing between adjacent projections and apertures for said suction means are provided in said valleys.

3. A wall surface according to claim 1 or claim 2 wherein the projections have heights which increase in the direction of fluid flow.

4. A wall surface according to claim 3 wherein adjacent projections have a spacing between them which spacing narrows in the direction of fluid flow.

5. A wall surface according to claim 4 wherein the projections have a substantially constant cross-sectional shape.

6. A wall surface according to claim 3 in which at least some of the projections have an initial height in the range of 2 to 45 wall units.

7. A wall surface according to claim 3 wherein the projections have heights which change with distance along the wall surface in the direction of fluid flow in dependence upon at least one of the following:

(a) counteraction for a self-limiting effect of the projections caused by progressive displacement of boundary layer turbulence away from the wall surface by the projections, (b) compensation for effects dependent upon Reynolds Number, (c) counteraction of the progressive displacement of boundary layer turbulence away from the wall surface by virtue of a streamwise increase of height of the projections, (d) compensation for variations of skin friction in flow direction.

8. A wall surface according to claim 1 wherein said projections are disposed at least partly in a laminar flow region.

9. A wall surface according to claim 8 wherein said projections in said laminar flow region have a height in the range of 0.03 to 0.2 of the boundary layer thickness.

10. A wall surface according to claim 9 wherein said projections in said laminar flow region have a height not substantially less than 0.1 of the boundary layer thickness.

11. A wall surface according to claim 10 wherein the projections increase in height in the direction of fluid flow in said laminar flow region at a rate of between 20% and 100% per meter length.

12. A fluid dynamic wall surface having a series of elongate projections on said surface extending substantially in the direction of fluid flow relative to said surface for said surface for modification of a boundary layer of said fluid flow on said surface, the heights of the projections progressively increasing with distance along the wall surface from their upstream ends, the projections having respective peaks along their length which extend substantially parallel to each other, said projections being spaced from each other at said upstream ends and having widths which increase with said increase in height, the spacing between said projections thereby decreasing along their longitudinal extent, and apertures being formed at least partly in said spacing between at least some of said projections for connection to a suction source, said projections extending from a base and said apertures being formed in said base between said at least some of said projections.

13. A fluid dynamic wall surface according to claim 12 wherein said spacing between the projections is at least mainly occupied by flat-bottomed valleys substantially coplanar with the wall surface.

14. A wall surface according to claims 1 or 12 wherein said projections have a spanwise pattern of varying heights.

15. A fluid dynamic wall surface having means for ameliorating the effect of a shock wave in a fluid flow over said surface comprising a series of elongate projections extending from a wall surface and extending in the direction of fluid flow relative to the surface between a lower pressure region upstream of said shock wave and a higher pressure region downstream of said shock wave, said projections having a non-dimensionalised height not substantially greater than 25 wall units, apertures in the wall surface between adjacent projections in both said regions of the wall surface and communication means between said apertures being provided whereby higher pressure fluid in the downstream region is drawn through the apertures in said region to be recirculated into the fluid flow through the apertures in the lower pressure upstream region.

16. A method of modifying the flow over a fluid dynamic wall surface in which said flow has a laminar boundary layer close to said wall surface, said surface being provided with a series of elongate projections extending substantially in the direction of fluid flow relative to the surface for interaction with said boundary layer and suction is applied between said projections to draw fluid through the wall surface, said projections extending from a base, said wall surface and said base being co-extensive.

17. A method according to claim 16 in which said projections are continued into a region of onset of transitional flow.

18. A method according to claim 16 or claim 17 in which the height of the projections is progressively varied over at least a part of their extent in the direction of fluid flow.

19. A method of modifying the flow over a fluid dynamic wall surface, said flow having a boundary layer close to said wall surface, in which said surface has an upstream region in which said fluid flow is laminar and a downstream region in which said fluid flow is turbulent, and said upstream and downstream regions being separated by an intermediate region in which the fluid flow is transitional, said surface being provided with a series of elongate projections extending substantially in the direction of fluid flow relative to the surface to interact with the boundary layer of said flow, the skin friction in the laminar region being reduced by drawing fluid from the flow through the wall surface by applying suction between successive projections, and said projections extending downstream from the onset of said transitional flow from said laminar flow regions to limit the rise of skin friction in said intermediate region, said projections extending from a base with said wall surface being co-extensive with said base.

* * * * *